Oct. 8, 1963  R. H. ZACHERY  3,106,249
HARVESTER FOR POTATOES AND THE LIKE
Filed Aug. 22, 1960  4 Sheets-Sheet 4

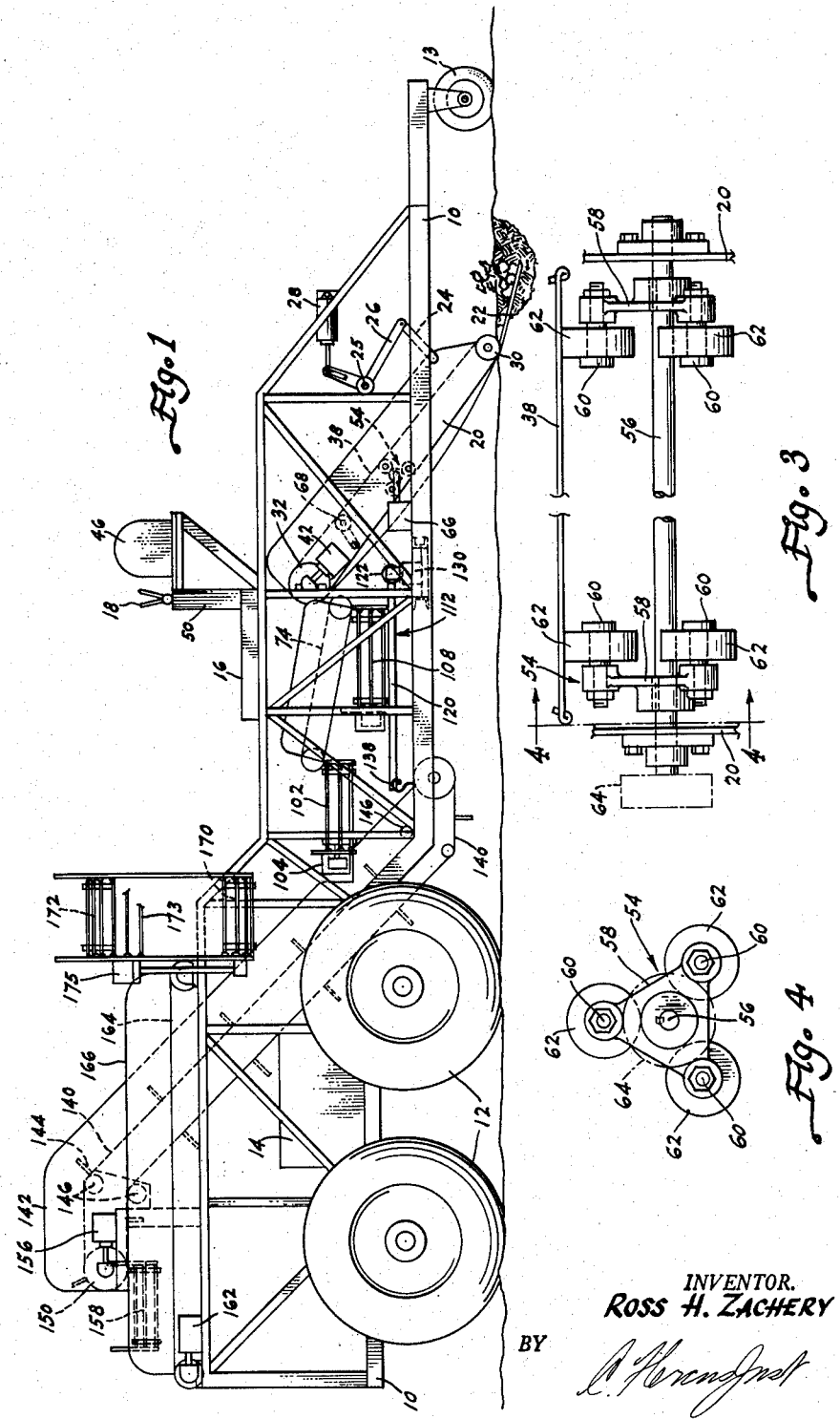

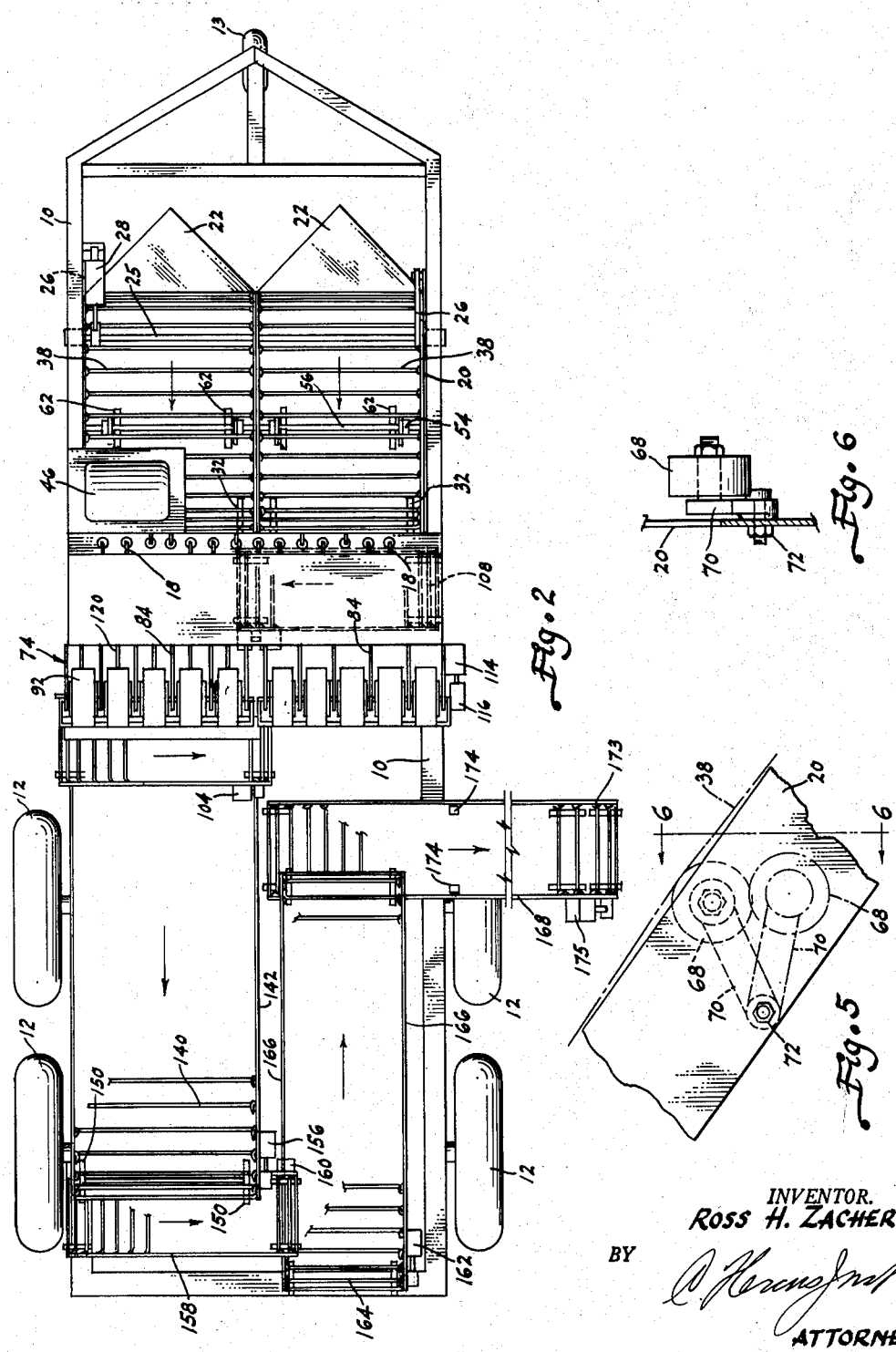

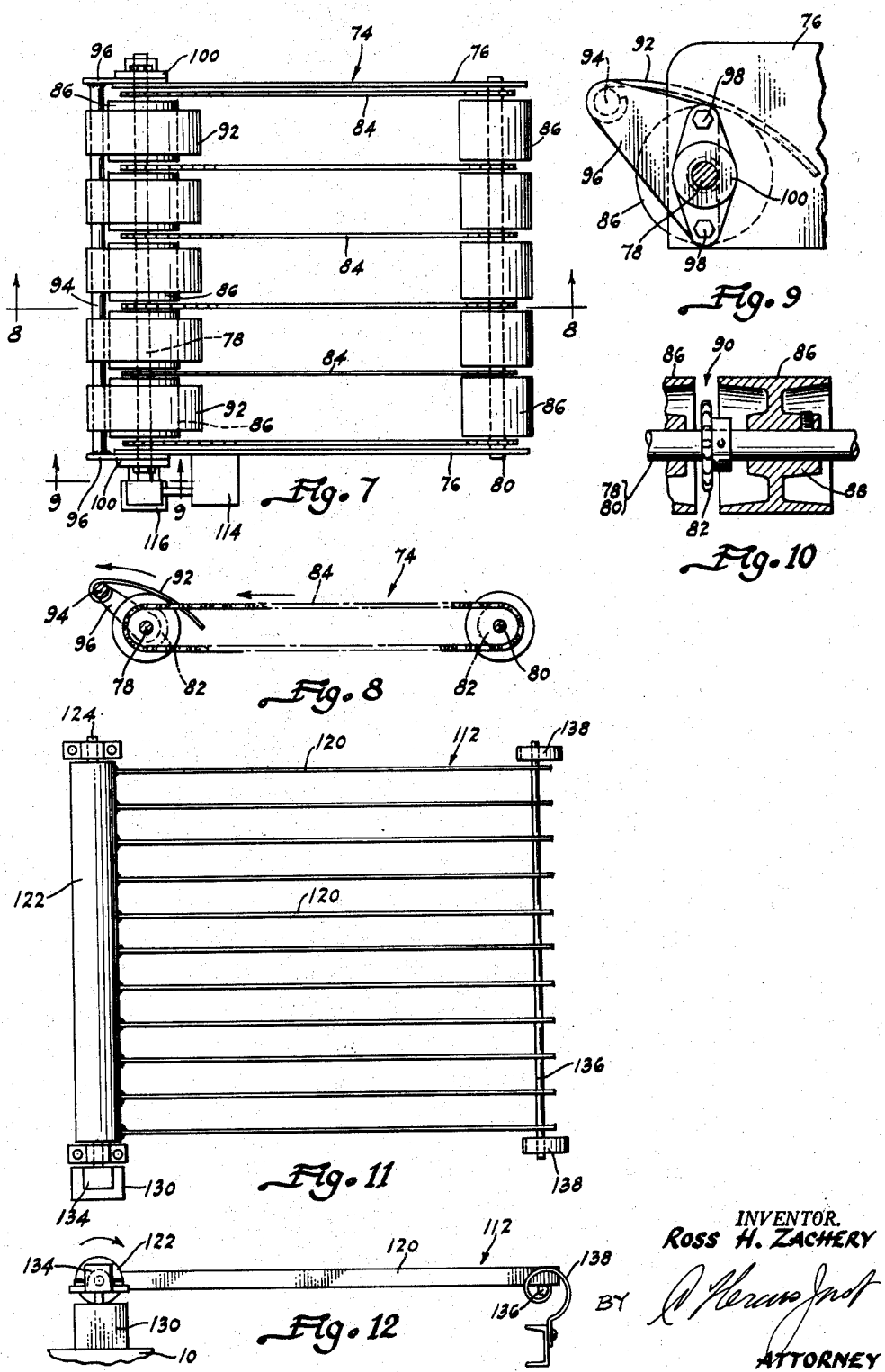

INVENTOR.
ROSS H. ZACHERY
BY
ATTORNEY

United States Patent Office 3,106,249
Patented Oct. 8, 1963

3,106,249
HARVESTER FOR POTATOES AND THE LIKE
Ross H. Zachery, 10 Miner St., Bakersfield, Calif.
Filed Aug. 22, 1960, Ser. No. 51,179
8 Claims. (Cl. 171—14)

This invention relates to improvements in a harvester for potatoes, and the like, and, more particularly, to a harvester capable of automatic operation to not only dig the potatoes from the soil but completely separate the potatoes from the vines and trash, clods, and loose soil adhering thereto at the time they are dug, whereby substantially clean potatoes are delivered from the harvester to any suitable collecting means, such as a truck moving along the field with the harvester, while soil, clods, vines and trash are dropped upon the field in orderly manner, whereby the harvested field is left in substantially level condition.

It is the principal purpose of the present invention to provide a number of improved features in such a harvester, including: more efficient agitating means for effecting initial separation of soil and clods from the potatoes immediately after the digging thereof and while being elevated for additional treatment, said agitating means being driven independently of the movement of the elevator conveyor, thereby effecting improved agitation, and in the preferred embodiment thereof, also providing adjustable means operable to limit the extent of agitation of the elevating conveyor, in accordance with required operational characteristics relative to the condition of the soil, at the time of harvest; vine and trash separating means of an improved and more efficient nature than any heretofore provided, said separating means receiving potatoes, vines and soil, including clods, from the elevating conveyor, and being operable, preferably independently of the elevating conveyor, to separate the vines and trash from potatoes and soil, the preferred construction of said separating means also including means to strip, from the separating means, vines which have been separated from the potatoes, whereby said separating means will not become fouled with vines and parts thereof; and improved means finally to separate potatoes from clods of soil and loose particles of soil adhering to the potatoes by vibration, said means being positioned to receive potatoes and clods and vibrate the same in such manner that the potatoes sustain a minimum of bruising, yet the action of the vibrating means is capable of disintegrating and separating clods from the potatoes while the potatoes gradually are moved to the exit end of the vibrating means.

Another object of the invention is to provide a plurality of potato digging plow means and reticulated conveyors associated with each plow means, so as to elevate the potatoes for subsequent treatment to separate the vines therefrom, there being a vine-separating means associated with the delivery end of each of said elevating conveyors, in conjunction with lateral conveying means adjacent the delivery end of one of said separating means operable to deliver the vines therefrom toward the exit end of the other separating means, whereby vines are discharged onto the ground at the rear end of said other separating means and at one side of the harvester which is away from the unharvested portion of the field.

Still another object of the invention is to provide additional lateral conveyor means which are ancillary to the object described immediately above, said additional lateral conveyor means being arranged to deliver potatoes and clods which have passed through one vine separating means to a vibrating unit beneath the other vine separating unit, whereby only a single vibrating unit serves two digging and elevating means and operates to disintegrate any clods remaining among the potatoes, after being separated from the vines and trash.

Details of the foregoing objects and of the invention are set forth in the following specification and illustrated in the accompanying drawings comprising a part thereof.

In the drawings:

FIG. 1 is a side elevation of an exemplary harvester for potatoes, and the like, embodying the principles of the present invention and being shown, in exemplary manner, in the process of harvesting a root-type crop, such as potatoes.

FIG. 2 is a top plan view of the exemplary harvester shown in FIG. 1.

FIG. 3 is a transverse sectional view, taken on a plane parallel to the axis of the shaft 56 of FIG. 1, but illustrated on a larger scale to show certain details of agitating means for the elevating conveyor which initially receives the dug potatoes, soil and vines.

FIG. 4 is an end view of the agitating means shown in FIG. 3, as seen from the line 4—4 of FIG. 3.

FIG. 5 is a fragmentary side elevation, on a substantially larger scale than employed in FIG. 1, and showing adjustable means for controlling the amount of agitation of the elevating conveyor, which is engaged by the agitating means shown in FIGS. 3 and 4.

FIG. 6 is a fragmentary sectional view taken on the line 6—6 of FIG. 5 and showing certain details of the adjustable means for controlling agitation, as seen at a right angle to the view shown in FIG. 5.

FIG. 7 is a top plan view of exemplary separating means, shown on a larger scale than in FIGS. 1 and 2, and operable to remove vines from potatoes and clods.

FIG. 8 is a side elevation of the separating means shown in FIG. 7, as seen on the line 8—8 thereof.

FIG. 9 is a fragmentary sectional view taken on the line 9—9 of FIG. 7 and employing a larger scale than that used in FIG. 7.

FIG. 10 is a fragmentary vertical sectional view, on a larger scale than used in FIG. 7, and showing an exemplary method of mounting the stripper means between the sprockets of the separating means shown in FIG. 7.

FIG. 11 is a top plan view of an exemplary vibrating means of the harvester shown in FIGS. 1 and 2, but illustrated on a larger scale than in said FIGS. 1 and 2.

FIG. 12 is a side elevation of the vibrating means shown in FIG. 11.

Figure 13:
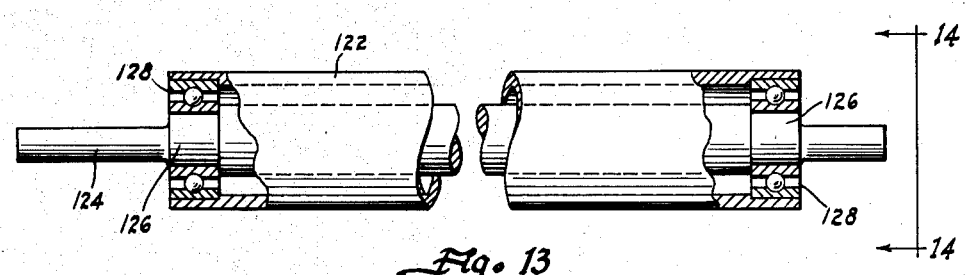
FIG. 13 is a side view of the drive means for the vibrating means shown in FIGS. 11 and 12, said drive means being broken away in the middle to foreshorten the view thereof and other portions thereof being broken away, in vertical section, to illustrate details of the construction.

The harvester comprising the present invention is best shown, in overall manner, in FIGS. 1 and 2. Referring to these figures, it will be seen that the harvester comprises an elongated, truss-like frame 10 which is relatively light in weight compared with the strength thereof. The frame is rendered mobile by being supported by a plurality of wheels 12 and a forward stabilizing wheel 13. Preferably, all of the wheels are movably mounted for steering, steering being accomplished by power means such as a suitable hydraulic motor controlled by one of a plurality of control levers 18 arranged conveniently to operating platform 16. Preferably, the harvester is self-propelled and, for such purpose, is provided with an engine 14 which is somewhat diagrammatically illustrated in FIG. 1, inasmuch as such fundamental construction does not comprise part of the present invention. As shown in FIG. 2, there is an operating platform 16 and a bank of control levers 18 respectively connected to a substantial number of hydraulic motors which operate various conveyors and other movable elements and units, details of which are described hereinafter.

There are various units, or elements, of the harvester which cooperate with each other so as to dig the crop, such as potatoes, elevate the same, while being agitated, to separate at least a certain amount of the soil from the potatoes, thereafter separate the vines and trash from the potatoes and clods, vibrate the potatoes and clods so as to disintegrate the clods and otherwise separate them from the potatoes, and, finally, elevate the relatively clean potatoes, by suitable conveyors, for discharge into collecting means, such as a truck traveling beside the harvester.

Preferably, all of these units or elements are independently operated and capable of being adjusted as to speed of operation, in most instances, by suitable separately controlled, preferably hydraulic power means, such as individual hydraulic motors, which are independently controllable by the operator, from platform 16, by means of control levers 18 connected to hydraulic control valves of conventional nature. Details of such power and control means are set forth hereinafter and the various elements and units of the harvester now will be described in the order in which they occur according to operation in the harvesting procedure outlined above.

Referring to FIGS. 1 and 2, particularly, a conveyor frame 20 extends at an angle, at the forward end of the frame 10, and is pivotally connected at its upper and rearward end to the frame 10. The lower, forward end of the conveyor frame 20 extends close to the ground. For purposes of effecting economy in harvesting costs, the preferred embodiment of the harvester illustrated herein and comprising the present invention contemplates the employment of a duplex conveyor frame 20 which supports, at the forward end, a pair of plows 22, arranged side by side, as shown in FIG. 2. By such arrangement, two rows of potatoes can be harvested simultaneously.

The plows 22 preferably are mounted rigidly on the lower and forward end of the conveyor frame 20. The frame 20 is supported by a pair of links 24 connected to opposite sides of the frame. Said links are connected to a shaft 25 mounted in bearings at the opposite sides of frame 10. Also connected to shaft 25, adjacent opposite ends, is a pair of arms 26 which are pivotally connected to links 24. Actuating arm 27 is connected at one end to shaft 25 also and the other end is connected to the piston rod of a hydraulic cylinder unit 28 supported by frame 10, as shown, for example, in FIG. 1. By such means, the plow end of frame 20 may be varied as to depth in the ground, whereby the plows may be appropriately regulated to reach just below the lowest level of the potatoes growing in the soil. Thus, no greater amount of soil is handled than is absolutely necessary, incident to the digging of the potatoes.

It is customary for the operator to watch the potatoes as they are handled by the harvester and, if he observes that any substantial number of the potatoes are being cut, this will indicate that the plows 22 are not set to dig sufficiently deep to plow up all of the potatoes, whereupon the forward end of frame 20 and the plows will be lowered appropriately by operating one of the hydraulic control levers 18 specifically provided therefor.

Mounted at opposite ends of the conveyor frame 20 are suitable sprocket gears 30 and 32, which are supported by the opposite ends of shafts 34 and 36 extending between bearings provided in the side members of the conveyor frame 20. Extending around the sprocket gears 30 and 32 are connected links of elongated bar-type which form endless, reticulated, flexible conveyors 38, details of which are best seen in FIGS. 2, 3, 15 and 16. There is such a conveyor for each plow 22.

A driving hydraulic motor 42 is connected to one side of frame 20 and, through a gear box 44, is connected to shaft 36 to drive the conveyors 38, as shown in FIGS. 1 and 2. Motor 42 is controlled by one of the levers 18. To furnish hydraulic power to the various hydraulic motors of the harvester, an engine-hydraulic pump power unit 46 is supported at any convenient location upon harvester frame 10, as shown in FIGS. 1 and 2. Such unit is of conventional type and includes a fluid reservoir. The pump outlet is connected to a pressure distributor 50, see FIGS. 1 and 2, to which the various control valves of levers 18 are connected and from which fluid pressure supply lines and return lines extend to the various hydraulic motors of the harvester. Such lines are of standard nature and are not illustrated.

Wherever possible, it is preferred that the hydraulic or fluid motors are connected, through gear boxes, if desired, directly to the shafts or other means to be driven by such motors, thereby eliminating any need for driving belts or chains, with the advantage that the fouling of the operation of the mechanism by vines, trash, dirt, stones, and the like, is minimized.

Figure 15:
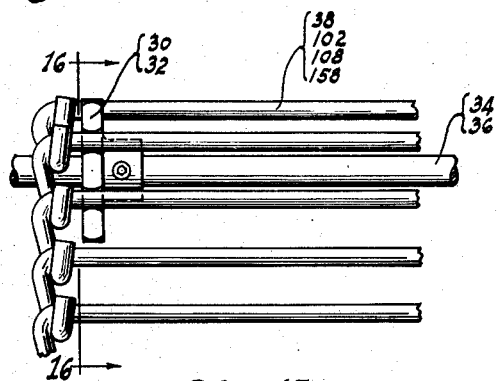
FIG. 15 is a fragmentary plan view showing an exemplary sprocket engageable with a fragmentary portion of the reticulated conveyors employed in various locations in the harvester illustrated in FIGS. 1 and 2, FIG. 15 employing a larger scale than that used in FIGS. 1 and 2.
Figure 16:
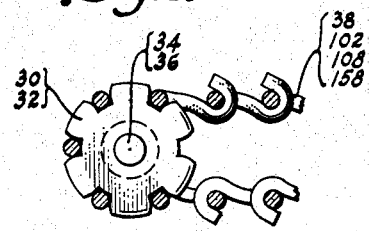
FIG. 16 is a side elevation, partly in vertical section, as seen on the line 16—16 of FIG. 15.

The pair of reticulated endless conveyors 38 on the conveyor frame 20 preferably are of the nature such as shown in greater detail in FIGS. 15 and 16. This type of conveyor is sometimes referred to as a chain-conveyor and is of a special type frequently employed in harvesters of this nature. The individual transverse bars of the conveyor are spaced apart on approximately 2" centers, for example, whereby soil, small stones, and the like, readily may filter between the bars and fall upon the ground, incident to the mixture of soil, potatoes, vines and trash being elevated by said conveyor 38 from the plows 22, to the upper end of the conveyor. At said elevated location, the elevated material is discharged onto the next unit of the harvester, as will be described hereinafter.

To facilitate the separation of the soil from the potatoes while being elevated by conveyor 38, the present construction, in accordance with the principles of the invention, provides agitating means 54, details of which are best seen in FIGS. 3 and 4. Such details comprise a shaft 56, which is mounted in suitable bearings carried by the conveyor frame 20. Spiders 58 are keyed to the shaft 56 so as to be driven thereby. The spiders 58 also have suitable holes in the ears thereof for receiving spindle bolts 60 which respectively rotatably support yieldable rollers 62. Said rollers may be formed from any appropriate material, such as synthetic rubber, one brand of which is sold under the trademark "Neoprene." By reason of said rollers being yieldable, they impose minimum wear upon the rods comprising endless conveyor 38, and the life of the rollers, likewise, is enhanced.

As is obvious, from FIG. 4 particularly, the tri-foil arrangement of the rollers 62, which are supported by the spiders 58, will result in the rollers 62 engaging the underside of the upper course of the conveyor 38 with a bumping, or vibrating agitation, the extent of which may be controlled by two means. One means is the speed at which the rollers 62 are moved by the shaft 56, as driven independently by hydraulic motor 66 suitably supported on the frame 20, relative to the movement of conveyor 38, and the other means is the movement-limiting means 68, details of which are best shown in FIGS. 5 and 6.

Such movement-limiting means are simple and comprise rollers 68, which are rotatably carried by the upper ends of pivotally adjustable arms 70. Each arm 70 is fixed to a shaft 72 extending between side plates 20 and the arms and shaft may be adjusted to any desired position of adjustment. It will be seen, particularly from FIG. 5, in which the broken line engaging the roller 70 represents the conveyor 38, that the opposite edges of the conveyor will each pass over and engage rollers 68 which are individually mounted upon arms 70. Preferably, the shaft 72 may be rotated within reasonable limits by hydraulic motor means, not shown, but similar to motor 28 and a crank arm on one end of shaft 72, connected by a link to the motor for remote control by one of the control valves 18.

In view of the provision of the movement-limiting means comprising rollers 68, it will be seen that the arm 70 may be adjusted to any desired position, depending upon the amount of agitation which is to be provided the conveyor 38 by the agitating means 54. Accordingly, if the rollers 68 are disposed in the uppermost position shown in FIG. 5, relatively little agitation will be afforded by agitating means 54. However, if the rollers 68 are depressed to the lower position shown in FIG. 5, for example, then a very substantial amount of agitation will be afforded the conveyor 38 by the agitating means 54. Such agitation results in very substantial separation of soil and clods from the potatoes and vines while being elevated by the conveyor 38.

Independent driving of the agitating means 54 relative to said conveyors is provided for so as to afford much more effective agitation of the conveyors than under circumstances where the conveyors are employed to move the agitating means. Accordingly, shaft 56 of the agitating means is driven directly by separate power means, such as a gear box 64 powered by a hydraulic motor 66, which, preferably, is of a variable speed type. This permits the agitation to be relieved, or intensified, as desired, depending, especially, upon whether the soil is heavy or light, and also in whatever desired relationship may be best, relative to the speed of the conveyor 38, but usually at a faster surface speed than that of said conveyor, so as to effect maximum agitation and, correspondingly, most efficient separation of soil and clods from the potatoes. Control of the operation of the motor 66 is effected through one of the control valves and levers 18.

The conveyor 38 will elevate not only the potatoes, clods and soil, but also vines and trash. The vines do not materially interfere with the separation of soil and clods from the potatoes while conveyor 38 is being agitated. However, it is essential and desirable to remove the vines and trash from the potatoes. Accordingly, the potatoes, vines, and such soil and clods as are still in the mixture delivered at the upper end of conveyor 38, are discharged thereat onto vine and trash separating means 74, details of which are best shown in FIGS. 2 and 7-10, to which attention is directed. The separating means 74 preferably is an independent unit of the harvester comprising the present invention, and cooperates wtih the other elements and units of the harvester to effect the desired result of harvesting potatoes in cleaned condition, with a minimum of expenditure of manual labor, and as automatically as possible.

The vine and trash separating means 74 comprises opposite, substantially parallel frame members 76. A pair of shafts 78 and 80 extend between the frame member 76 adjacent opposite ends thereof. As best seen in FIG. 8, a plurality of sprocket gears 82 are fixed to the shafts 78 and 80 in longitudinally spaced relationship to each other, whereby a plurality of endless belts, or sprocket chains, 84 extend respectively around the sprocket gears, or pulleys, 82. One such flexible means which has been employed effectively comprises conventional bicycle sprocket chains. It will be noted, from FIG. 7, that the chains, or belts, 84 are spaced apart transversely a sufficient distance that potatoes and clods easily may fall between said endless, flexible members 84.

In order to insure that the vines and trash will not become enmeshed or fouled up with the members 84, the separating means 74 comprise anti-fouling means between each of the sprockets 82, as best seen in FIGS. 7 and 8. One simple form of such anti-fouling means may comprise a plurality of simple pulley-like members 86, one exemplary type of which is shown in detail in FIG. 10. It will be seen that, essentially, these members comprise a drum having a hub 88 which is keyed to the shafts 78 and 80 between the sprocket gears 82. The members 86, therefore, revolve with the shafts 78 and 80 and effectively serve to prevent vines and trash from becoming fouled between the endless members 84 and the pulleys, or sprocket gears, 82 by which they are supported. Preferably, the spaces 90, between the members 86, are relatively narrow.

To assure the discharge of vines and trash from the left-hand end of the separating means 74, as viewed in FIGS. 7 and 8, whereby said vines and trash move in the direction of the arrows shown in FIG. 8, the left-hand end of the unit 74 is provided with guide means of simple type, such as a plurality of curved guide blades 92, one end of each of which is wrapped around and fixed to a fixedly mounted shaft 94, supported at its opposite ends by a pair of arms 96, as best shown in FIG. 9 in detail. The arms 96 are carried by the frame member 76, for example, and the bolts 98, by which bearing members 100 are secured to the frame member 76, may, likewise, be employed to attach the arms 96 to the frame member 76.

By referring to FIG. 2, it will be seen that one of the vine separating units 74 is disposed adjacent the upper and rearward end of each of the conveyor frames 20. The vines and trash will be discharged from the left hand ends of said units, as viewed in FIG. 2, and, in order that the uppermost of said separating units, as viewed in FIG. 2, will discharge the vines and trash so as not to interfere with other conveyors, to be described, which are below the separating units, a traversing conveyor 102, which, essentially, may be of the same general type as conveyors 38, is mounted so as to extend around suitable sprocket gears supported by a shaft and driven, for example, by power means comprising another independent hydraulic motor 104, shown in FIGS. 1 and 2, carried by the frame supporting the conveyor 102. Said motor is controlled by another one of the control valves and levers 18.

As a result of using traversing conveyor 102, the vines will be conveyed transversely of the harvester, in the direction of the arrow shown in FIG. 2, whereby the vines from the uppermost or, actually, the left-hand, separating unit 74, as seen in FIG. 2, will be discharged to the rearward end of the lowermost or, actually, the right-hand separating unit 74, in said figure, whereby all of the vines will be discharged to the rear of the lowermost separating unit 74 which will be the right-hand unit, as considered in the direction of movement of the harvester along a field. As illustrated especially in FIG. 2, it is contemplated that the unharvested rows of potatoes will be to the upper side of said figure, or the left-hand side of the harvester as it moves along the field, whereby discharge of vines and trash will be toward the right-hand side of the harvesting machine and, thus, not interfere with the unharvested portion of the field. Soil and clods which are discharged through the endless elevating conveyors 38, as well as through the separating means 74, will fall upon the portion of the field which has just been harvested and will thus result in a substantial levelling of the field as the harvester passes thereover.

All of the potatoes which are elevated by the conveyors 38 will drop through the spaces between the bars of the belts, or sprocket chains, 84 of the separating means 74, together with some clods comprising those which did not fall through the spaces of the elevating conveyors 38. The potatoes dropping through the lowermost separating unit 74, as seen in FIG. 2, or the right-hand separating means, will be discharged upon a second traversing conveyor 108, best seen in FIGS. 1 and 2, this conveyor being, preferably, the same general type as elevating conveyors 38. Traversing conveyor 108 is supported by similar sprocket gears fixed to shafts carried by the opposite ends of frame members 110, see FIG. 2, one of the shafts of the sprockets for the conveyor 108 being driven independently by power means, such as still another hydraulic motor 112, which is controlled independently by one of the control valves and levers 18 carried by the distributor 50, for example.

The conveyor 108 moves in the general direction of the arrow shown in FIG. 2 for purposes of discharging the potatoes and clods mixed therewith onto a vibrating unit 112, details of which are best shown in FIGS. 11 and 12. The potatoes and clods mixed therewith, which are discharged from the uppermost separating means 74, as viewed in FIG. 2, or the left-hand unit, as considered in the direction of travel of the harvester, will be discharged directly onto the vibrating unit 112. Said unit is driven by another power means, such as hydraulic motor 114, see FIG. 1, said motor preferably being of the variable speed type and controlled by still another control valve means 50 carried by the standard 52. The motor 114 also is connected, by a suitable means such as gear box 116, to shaft 78, whereby operation of the separating units 74 occurs at the will of the operator through one of the control valves and levers 18 to cause the endless flexible belts, or sprocket chains 84 thereof to travel in the direction of the arrow shown in FIG. 8.

The vibrating unit 112 comprises a series of grate bars 120 which are relatively thin and the spaces therebetween are such that they will not permit the desired minimum size of potato to pass therethrough, but clods may pass therethrough and, if the clods are too large to pass therethrough, the action of the vibrating unit 112 is such that it disintegrates the clods to sufficiently small size that the particles thereof may pass through the spaces between the grate bars 120.

Figure 14:
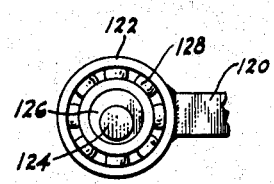
FIG. 14 is an end view of the drive means shown in FIG. 13, as seen on the line 14—14 at one end of said figure.

One end of each of the grate bars 120 is fixed, such as by welding, to a tubular member 122, details of which are best shown in FIGS. 13 and 14. Extending through tubular member 122 is a shaft 124, having eccentrics 126 fixed thereto near the opposite ends thereof. The eccentrics are connected to the inner races of ball bearing assemblies 128, the outer races of which are received within suitable seats formed internally in the opposite ends of tubular member 122, as clearly shown in FIG. 13. The outer races are fixed relative to tubular member 122, while the inner races rotate with the eccentrics 126 as the shaft 124 is driven by a hydraulic motor 130 through a gear box 134, the motor preferably being controlled by another control valve and lever 18 on distributor 50 on hydraulic motor 114. The foregoing mechanism comprises drive means to positively actuate said vibrating unit 112.

The opposite ends of the grate bars 120 are fixed to a traverse rod or shaft 136, the opposite ends of which respectively are carried by flexible, curved leaf-springs 138. The shape of the springs 138 is such so as readily to permit a limited amount of both horizontal and vertical movement of the grate bars 120, thereby absorbing the shock of potatoes and clods falling thereupon, and also aiding in disintegrating clods so as to assist in the final separation of clods from the potatoes. The action imparted to the grate bars 120 by the operation of the eccentrics 126 is such that the bars 120 are moved longitudinally, as well as vertically, at the ends thereof which are connected to the tubular member 122. Hence, a sort of gyratory motion is afforded the grate bars, within a vertical plane, especially at the left-hand end of the grate bars, as viewed in FIGS. 11 and 12. When the rotation of the shaft 124 is in the direction of the arrow shown in FIG. 12, the movement of the grate bars 120 is such that the potatoes, freed from clods, will gradually be moved to the right-hand, or delivery, end of the grate bars 120, as seen in FIGS. 11 and 12, but to the left-hand end, as seen in FIG. 1. The discharge end of the grate bar assembly preferably is slightly lower than the other end to facilitate discharge.

The potatoes, now freed from all trash, vines, clods, and substantially all soil, are delivered from the right-hand, or rearward, end of the vibrating unit 112 onto the lower, or receiving, end of elevating conveyor 140, which is best shown in FIGS. 1 and 2. Said conveyor, preferably, is also of the reticulated type, similar to the conveyor 38, for example, and is positioned between suitable side plates 142 so as to prevent the potatoes from falling from the sides. In view of the rather sharp rise of the conveyor 140, said conveyor, preferably, is provided with transverse blade-like members 144, which, for example, may be flexible and made from material similar to that from which rubber belting is made.

The members 144 are connected to certain of the cross bars of the reticulated conveyor 140, by any suitable means, such as clamping, and a plurality of guide and idler pulleys 146 are carried by the frame which supports the elevating conveyor 140, so as properly to guide the same through its desired path of movement. At the opposite ends of the conveyor 140, supporting sprockets 148 and 150 are suitably mounted upon appropriate shafts, the shaft 152 being driven by a suitable gear box 154 driven by independent hydraulic motor 156 fixed to one of side plates 142 and said motor being controlled by one of the control valves and levers 18 upon the distributor 50. The motor 156, preferably, is of the variable speed type.

The cleaned potatoes, while being elevated by conveyor 140, and, particularly since conveyor 140 is also, preferably, of the reticulated type, will be subject to additional separation from any residual soil thereon during such movement, especially when the conveyor passes over the various guide pulleys 146, whereby the direction of movement of the chain of the conveyor 140 is changed, which results in a certain amount of jostling of the potatoes. Finally, however, the potatoes are discharged from the upper and rearward end of elevating conveyor 140 onto another transverse conveyor 158, this being driven by another power means, such as a hydraulic motor 160, which is connected to one of the shafts supporting the sprockets of the transverse conveyor 158. Motor 160, likewise, is controlled by another control valve and lever 18 on the distributor 50. The transverse conveyor 158 moves in the direction of the arrow shown in FIG. 2, to deliver potatoes onto the rearward end of forwarding conveyor 164.

Figure 17:
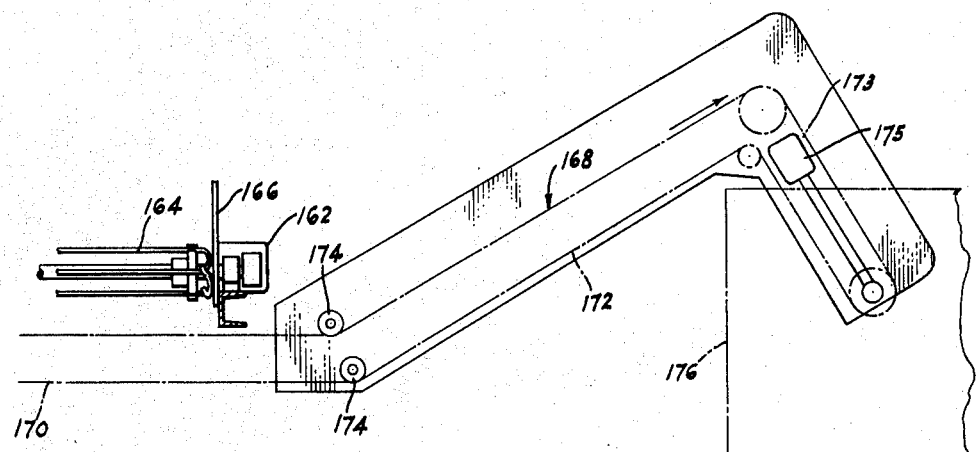
FIG. 17 is a fragmentary vertical sectional view taken on a plane parallel to the longitudinal extent of the conveyor 168 of FIG. 2, but employing a larger scale than in FIG. 2, and showing certain details of the delivery conveyor of the harvester positioned for discharge of cleaned potatoes into collecting means, such as an exemplary truck.

The forwarding conveyor has appropriate confining sides 166 and is driven by motor 162. At the forward end of conveyor 164, still another transverse and discharge conveyor 168 is mounted. This latter conveyor is best shown in FIGS. 1, 2 and 17. Preferably, the conveyor 168 has a substantially horizontal portion 170, an upwardly and outwardly extending portion 172, and an outwardly and downwardly inclined discharge end 173. Appropriate idler and direction-changing pulleys 174 are provided to guide the conveyor 168 appropriately. Conveyor 168 is driven by the motor 175 carried by the frame of conveyor 168. As seen in FIG. 17, the upper and outer end of conveyor 168 is arranged conveniently to discharge potatoes in the direction of the arrow shown in said figure, into a suitable collecting means, such as a truck 176 moving along the field at the same speed as the harvester, with a minimum of bruising. Motor 175 is controlled by another control valve and lever 18 on distributor 50.

By employing simple power means, such as variable speed hydraulic motors, for example, where appropriate, or uni-directional hydraulic motors, for driving the various units and elements of the harvester, it will be seen that the drive means is much more simple, flexible and fool-proof than a drive system using shafts, universal joints, belts, pulleys, and other forms of power transmission, from a common source of power, such as the engine of the harvester.

While the invention has been described and illustrated in its several preferred embodiments, it should be understood that the invention is not to be limited to the precise details herein illustrated and described, since the same may be carried out in other ways falling within the scope of the invention as claimed.

I claim:

1. A harvester for potatoes, and the like, comprising, in combination, a frame, means to render said frame mobile, plow means supported by said frame and operable to remove potatoes and vines from the soil over which said harvester moves, flexible reticulated endless conveyor means carried by said frame and one course thereof being positioned to receive and elevate from said plow means vines and potatoes and clods, agitating means comprising members movable relative to said conveyor means and engageable directly with the flexible conveyor per se to vibrate the same at a localized position so as effectively to jostle the conveyor and also potatoes and clods thereon in a substantially vertical direction to cause separation and removal from said potatoes of soil and clods through the openings of said conveyor means, power means connected to said conveyor agitator means and operable to drive the same for movable engagement with said conveyor means, means to control the speed of said agitator means independently of the speed of the conveyor to permit regulation of the frequency at which the agitator means engages the conveyor means whereby maximum separation of soil and clods from potatoes may be achieved by regulation of said speeds to suit the condition of the soil from which the potatoes are being harvested, vine and trash separating means carried by said frame and positioned to receive the material elevated by said reticulated conveyor and operable to remove vines and trash from the potatoes and clods received thereby, vibrating means positioned to receive potatoes and clods from said trash separating means, and drive means connected to said vibrating means and operable to positively vibrate the same to disintegrate clods and pass the same from potatoes while advancing said potatoes for discharge from said harvester free from soil and vines.

2. The harvester set forth in claim 1 further characterized by said conveyor agitating means comprising a shaft extending transversely to the path of movement of said conveyor means beneath the upper course thereof and substantially parallel thereto, and spider means projecting radially from said shaft adjacent opposite ends thereof and supporting rollers on the outer ends thereof in circumferentially spaced relationship to each other, said rollers being directly engageable with the undersurface of said upper course of said flexible conveyor means per se and sequentially engageable therewith and movable relative thereto peripherally to vibrate the same, the power means for said agitating means being connected to said shaft.

3. A harvester for potatoes, and the like, comprising, in combination, a frame, means to render said frame mobile, plow means supported by said frame and operable to remove potatoes and vines from the soil over which said harvester moves, flexible reticulated conveyor means carried by said frame and positioned to receive and elevate from said plow means vines and potatoes and clods, means engageable with and operable to agitate the conveyor means substantially vertically to its path of movement to cause separation and removal from said potatoes of soil and clods through the openings of said conveyor means, vine and trash separating means carried by said frame and positioned to intersect the path of movement of the material discharged by gravity from one end of said reticulated conveyor and operable to remove vines and trash from the potato and clod material received thereby, said separating means comprising a series of positively driven transversely spaced endless flexible members extending transversely to the falling movement of material from said conveyor and the spaces therebetween permitting passage of potatoes and clods therebetween by gravity while positively carrying vines and trash transversely from said path of fall of material to separate said vines and trash therefrom and to positively move the latter from the path of oncoming vines and trash, and means positioned to receive potatoes and clods from said trash separating means and operable to disintegrate clods and pass the same from potatoes while advancing said potatoes for discharge from said harvester free from soil and vines.

4. The harvester set forth in claim 3 further including rotatable means supporting said endless flexible members of said separating means and drive means connected to said rotatable means and operable to drive the same substantially in the same general longitudinal direction as said conveyor means but said flexible members being positioned below the discharge end thereof.

5. The harvester set forth in claim 3 further characterized by said flexible members comprising endless chains supported by sprocket gears rotatably mounted adjacent opposite ends of said separating means, power means connected to said sprocket gears and operable to drive the same and chains thereon in unison, and stripping means mounted adjacent at least certain of said sprocket gears and operable to strip vines and trash from said chains, thereby to prevent fouling thereof by vines and trash.

6. The harvester set forth in claim 5 further characterized by said stripping means comprising stationary blades mounted between adjacent chains and also adjacent said sprocket gears.

7. A harvester for potatoes, and the like, comprising, in combination, a frame, means to render said frame mobile, plow means supported by said frame and operable to remove potatoes and vines from the soil as said harvester moves thereover, flexible reticulated conveyor means carried by said frame and positioned to receive and elevate from said plow means vines and potatoes and earth clods, means operable to agitate the conveyor means substantially vertically to its path of movement to cause separation and removal from said potatoes of soil and clods through the openings of said reticulated conveyor means, vine and trash separating means carried by said frame and positioned to receive the material after being elevated by said reticulated conveyor and operable to remove vines and trash from the potatoes and clods received thereby, means comprising a substantially horizontal grate means resiliently mounted at one end and positioned to receive potatoes and clods from said trash separating means, and power means operable to gyrate and thereby vibrate said grate means in both vertical and horizontal directions to disintegrate clods and remove the same from potatoes by the broken clods dropping through said grate means while advancing said potatoes along said grate means for discharge from said harvester free from soil and vines.

8. The harvester set forth in claim 7 further characterized by said gyrating means comprising eccentric means rotatably mounted adjacent one end of said grate means and connected thereto to support the same, and flexible means connected to the other end of said grate means to support the same movably, the power means being connected to said eccentric means and operable to rotate the same to effect limited vibration of said grate means in opposite vertical directions in addition to vibration of the same in opposite horizontal directions, whereby a somewhat gyratory motion within a vertical plane is imparted to said grate means.

References Cited in the file of this patent

UNITED STATES PATENTS

| | | |
|---|---|---|
| 1,591,824 | Herold | July 6, 1926 |
| 1,715,218 | Wright et al. | May 28, 1929 |
| 2,468,639 | Sample | Apr. 26, 1949 |
| 2,577,525 | Johnston | Dec. 4, 1951 |